US010951900B2

(12) United States Patent
Lei et al.

(10) Patent No.: US 10,951,900 B2
(45) Date of Patent: Mar. 16, 2021

(54) SPEEDING UP SMALL BLOCK INTRA-PREDICTION IN VIDEO CODING

(71) Applicant: INTEL CORPORATION, Santa Clara, CA (US)

(72) Inventors: Zhijun Lei, Portland, OR (US); Jason Tanner, Folsom, CA (US); Satya N. Yedidi, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/015,758

(22) Filed: Jun. 22, 2018

(65) Prior Publication Data

US 2019/0045196 A1 Feb. 7, 2019

(51) Int. Cl.
| | |
|---|---|
| *H04N 19/159* | (2014.01) |
| *H04N 19/124* | (2014.01) |
| *H04N 19/176* | (2014.01) |
| *H04N 19/436* | (2014.01) |
| *H04N 19/122* | (2014.01) |
| *H04N 19/46* | (2014.01) |
| *H04N 19/11* | (2014.01) |
| *H04N 19/157* | (2014.01) |

(52) U.S. Cl.
CPC .......... *H04N 19/159* (2014.11); *H04N 19/11* (2014.11); *H04N 19/122* (2014.11); *H04N 19/124* (2014.11); *H04N 19/157* (2014.11); *H04N 19/176* (2014.11); *H04N 19/436* (2014.11); *H04N 19/46* (2014.11)

(58) Field of Classification Search
CPC .... B60T 13/662; H04N 19/11; H04N 19/122; H04N 19/124; H04N 19/157; H04N 19/159; H04N 19/176; H04N 19/436; H04N 19/46
See application file for complete search history.

(56) References Cited

U.S. PATENT DOCUMENTS

| | | | |
|---|---|---|---|
| 9,350,988 B1 * | 5/2016 | Bankoski | H04N 19/174 |
| 10,284,866 B1 * | 5/2019 | Zhao | H04N 19/44 |
| 2006/0126730 A1 * | 6/2006 | Arakawa | H04N 19/176 |
| | | | 375/240.03 |
| 2016/0373740 A1 * | 12/2016 | Nagumo | H04N 19/14 |
| 2016/0381386 A1 * | 12/2016 | Krishnan | H04N 19/436 |
| | | | 375/240.14 |
| 2019/0281289 A1 * | 9/2019 | Zhao | H04N 19/11 |

FOREIGN PATENT DOCUMENTS

KR    20150069110 A   *  6/2015

OTHER PUBLICATIONS

Zhatt, Bruno et al.; "3D Video Coding for Embedded Devices, Energy Efficient Algorithms and Architectures"; •ISBN 978-1-4614-6759-5, Springer-Verlag New York, Publisher, Copyright Holder Springer-Science +Business Media New York, copyright 2013, 219 pages.

* cited by examiner

*Primary Examiner* — Joon Kwon
(74) *Attorney, Agent, or Firm* — Hanley, Flight & Zimmerman, LLC (57) ABSTRACT

Speeding up small block intra-prediction in video coding is described herein. The system includes an encoder. The encoder is to execute intra-prediction by deriving a plurality of prediction angles, wherein the prediction angles are based on a video coding standard. The encoder is also to disable a prediction angle for a current block to eliminate a dependency on an immediate predecessor block.

24 Claims, 7 Drawing Sheets

SPEEDING UP SMALL BLOCK INTRA-PREDICTION IN VIDEO CODING

BACKGROUND ART

A video stream may be encoded into a variety of video compression formats, or the characteristics of the stream may be changed. In most modern video coding standards, a minimum block size for intra-prediction may be as small as 4×4 pixel blocks. Encoding may also be used when preparing the video stream for transmission between devices or components of computing devices.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Video coding is often performed with a focus on maintaining a high coding efficiency to meet the bandwidth requirement of video transmission systems. As used herein, a high coding efficiency refers to the coding of a video to achieve a highest video quality within a target bit rate. An encoder may achieve a high coding efficiency by using various techniques to predict the content contained in each frame or portion of a frame.

I.

Inter-prediction may predict the content of a current frame based on the content of a prior or subsequent frame. Intra-prediction may predict the content of a macroblock of a frame based on other neighboring macroblocks of the same frame. As used herein, a macroblock is a processing unit that can be further divided into transform blocks and prediction blocks. While the term macroblock, transform block, and prediction block are used herein, these terms should not be considered necessarily limiting. The terminology used to describe processing units during intra-prediction may vary according to each video coding specification. For example, the Joint Photographic Experts Group (JPEG) standard refers to minimum coded unit (MCU) blocks. The H.264/Advance Video Coding (AVC) standard refers to macroblocks. The H.264/AVC standard was developed by a partnership known as the Joint Video Team (JVT), initially released in May 2003. Additionally, the H.265/HEVC standard was developed by the JVT as an extension of H.264/AVC, initially released in June 2013.

The presented techniques may be used with video coding standards that include intra-prediction. Intra-prediction for smaller blocks is often supported down to a block with minimum block size of 4×4 pixel blocks. For a hardware encoder implementation, intra-prediction for 4×4 pixel blocks can cause an increase in latency due to the dependency between the small neighboring blocks in addition to actual processing of each blocks. The presented techniques may be used to eliminate the dependency of a current block to its immediate predecessor block. By eliminating this dependency, the processing of multiple 4×4 pixel blocks in a hardware encoder pipeline can be done in parallel to improve performance. Specifically, processing small pixel blocks in parallel results in a higher throughput and faster processing of an image frame.

Embodiments described herein enable fast processing of small blocks in the intra-prediction stage of video coding. In embodiments, an encoder mode decision stage can purposely disable searching certain intra-prediction angle modes depending on the processing order of encoder. The disabled prediction angles remove any dependency between blocks that conflicts with the processing order. By removing this dependency, the processing of multiple blocks in the encoder can be parallelized to reduce latency and improve performance. The presented techniques significantly improve the pipeline performance for the intra-prediction stage when a lot of 4×4 blocks are used.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
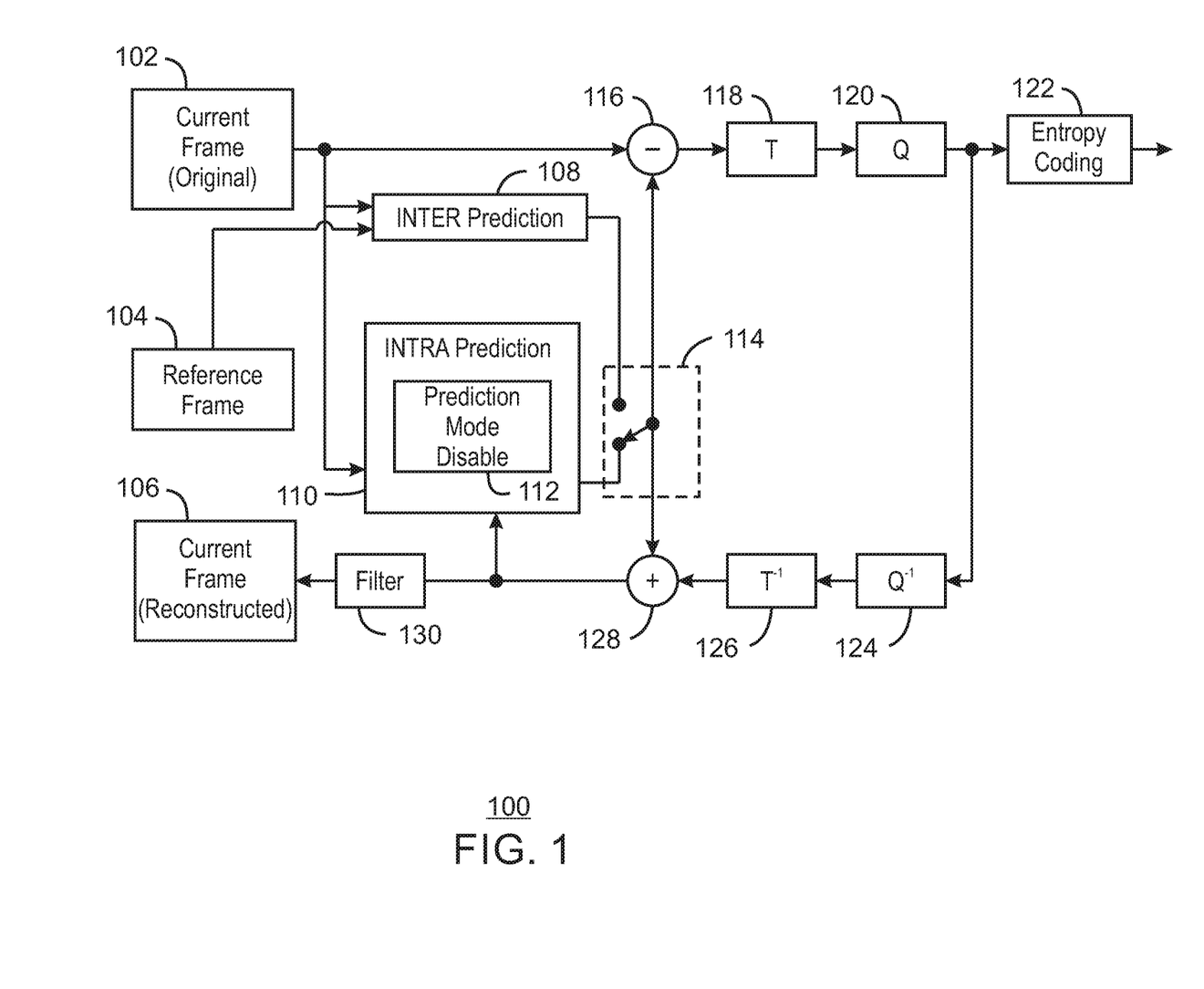
FIG. 1 is an encoding pipeline with small block intra-prediction.

FIG. 1 is a block diagram of a hardware encoding pipeline 100 that enables small block hardware video coding. The intra-prediction of FIG. 1 may dynamically disable an intra-prediction mode based on a processing order of a macroblock during encoding. In examples, a video or other sequence of visual images may be presented as a series of frames. The encoding pipeline 100 results in compression of the frames by reducing redundancies between strategically selected samples in the sequence of frames. The hardware encoding pipeline 100 is for exemplary purposes, and may contain more or fewer components than what is presently illustrated. The encoding pipeline may determine the particular prediction to be used for each frame, apply transforms to the predicted frames, and then perform entropy encoding. The processing units of the frame may vary in size according to the content contained in the sequence of images, the particular coding standard used, or any combination thereof. For example, a frame may be partitioned into a number of 16×16 macroblocks. Each macroblock may be further divided into sixteen blocks of 4×4 pixel blocks. The 4×4 pixel blocks may be used for prediction during intra-prediction.

In FIG. 1, a current frame 102 is to be encoded. The prediction portion of encoding can be performed via inter-prediction 108 or intra-prediction 110. A selection between the two prediction options 108 and 110 is made by a mode decision block 114. During inter-prediction 108, motion estimation (ME) is used to exploit the redundancy between adjacent frames to achieve compression by selecting a frame as a reference frame 104 and predicting subsequent frames such as the current frame 102 from the reference frame 104. The inter-prediction 108 may be described by a plurality of motion vectors calculated via motion estimation. The vectors can be encoded and stored or transmitted to a decoder. The type of prediction made for each frame during inter-prediction 108 may differ based on the content of each frame. For example, the frames may be encoded based on a forward inter-prediction mode where a future frame is used in the prediction, backward inter-prediction mode when a previous frame is used in the prediction, or bidirectional inter-prediction mode the used both of a previous frame and a future frame for prediction. The frames may also be inter-predicted according to a particular standard, such as the H.264/MVC video coding standard.

The intra-prediction 110 uses neighboring pixels within the same frame to predict the samples in the current macroblock. During intra-prediction 110 redundancies in pixel blocks are eliminated based on information contained within the same frame. In particular, intra-prediction 110 may be applied to a current frame 102 to exploit the correlation among pixels of the same current frame 102. Typically, the closest encoded pixels to the above, above left, above right, and left are used to extrapolate data for the current block. Accordingly, those pixels to the above, above left, above right, and left should be processed prior to processing a current pixel. A prediction mode searching stage during intra-prediction explores the spatial correlation between the current pixel blocks and the neighboring blocks that have been encoded following the encoder processing order. The prediction mode searching stage then derives a prediction angle (direction) to indicate which previously encoded blocks can produce an optimal predicted pixel block for the current block with a lowest prediction error when compared to other prediction angles. An intra-prediction mode decision stage can then define the prediction angle as the final intra-prediction mode for that particular pixel block.

Video coding standards often support multiple coding block sizes for intra-prediction. For example, the H.264/AVC coding standard supports three macroblock partitioning sizes for intra-frame prediction: a 4×4 pixel block, a 8×8 pixel block and a 16×16 macroblock. The 4×4 pixel block size has nine possible prediction angles as described in FIG. 3. During coding, each of the sixteen 4×4 pixels blocks of a macroblock may search different prediction angles in order to find the best prediction angle. Intra-prediction can also be performed using a 16×16 macroblock size. However, with a 16×16 macroblock size the number of prediction directions is restricted.

During intra-prediction 110, a prediction mode disable block 112 may be used to disable intra-prediction angles based on at least a processing order of a macroblock. The processing order may be as described with respect to FIG. 2. To reduce latency associated with searching all available prediction angles during the intra-prediction searching stage, the present techniques disable prediction angles for a particular block based on the block's location within the processing order and the availability of predecessor blocks based on the encoding processing order.

The output of the predictions at block 108 and 110 is a large set of prediction candidates. Among all different block sizes for intra-prediction 110 and inter-frame prediction 108 a best prediction mode is selected by a mode decision 114. The best prediction mode may be the prediction mode that has the lowest prediction error while being within a limit for the number of bits to encode the block as specified by the coding standard. In some cases, a sum of absolute errors (SAE) may be used to determine the magnitude of the prediction error. The prediction candidate with the lowest SAE is the best prediction mode. As illustrated, the mode decision block has selected the result of intra-prediction for the current frame.

The predicted macroblock and the original macroblock are subtracted at reference number 116 to generate a residual of the prediction. The residuals may be transformed at block 118 from the space domain to the frequency domain using an integer approximation of the 4×4 two-dimensional (2D) discrete cosine transform (DCT) transform. If an intra-prediction 16×16 block is selected, an additional Hadamard transform is applied after the DCT at block 118. At block 120, each block is quantized to reduce a dynamic range of the coefficients for the entropy coding. The quantized coefficients are sent to an entropy encoder 122. After the entropy coding, the bitstream is assembled and the encoding is complete.

A processing loop for intra-prediction includes reconstructing the quantized macroblock to be used as a reference for macroblocks of the same frame. Accordingly, an inverse quantization at block 124 and inverse transform at block 126 are applied to the quantized coefficients. Once the image residuals are inversely transformed and quantized, they are added to the predicted block at reference number 128 in order to reconstruct the decoded macroblock. The processing loop may be referred to as reconstruction or a reconstruction loop. This reconstruction enables consistency between the encoder and decoder processing to avoid drifting between the encoder and decoder. The reconstructed macroblock may be filtered at block 130 for use during other prediction modes, while intra-prediction uses unfiltered macroblocks inside a frame.

Figure 2:
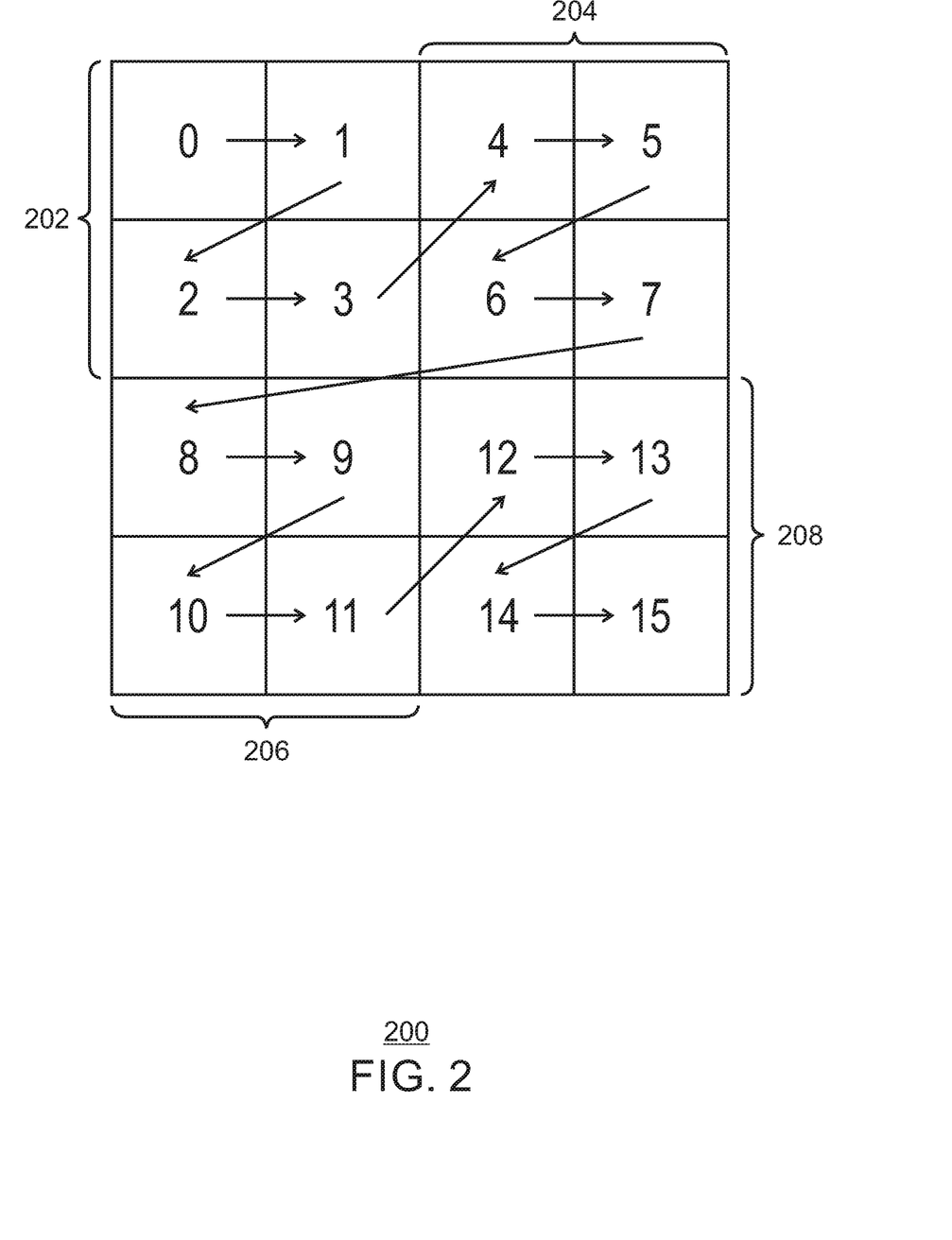
FIG. 2 is a block diagram of an encoding processing order.

FIG. 2 is an illustration of a 16×16 macroblock 200. The macroblock 200 includes sixteen intra-predicted 4×4 pixel blocks. In particular, 8×8 block 202 includes 4×4 pixel blocks 0, 1, 2, and 3. The 8×8 block 204 includes 4×4 pixel blocks 4, 5, 6, and 7. The 8×8 block 206 includes 4×4 pixel blocks 8, 9, 10, and 11, and the 8×8 block 208 includes 4×4 pixel blocks 12, 13, 14, and 15. The processing order of the macroblock 200 directly affects the dependencies from 4×4 pixel block to 4×4 pixel block during encoding. In a typical hardware implementation, within a macroblock, each of the 4×4 intra predicted pixel blocks 0-15 are processed following the order illustrated in FIG. 2. Specifically, the blocks are processed from block 0 to 15 in a sequential fashion. The arrows between each 4×4 pixel block illustrate the processing order, starting with block 0 and ending with block 15. In some cases, this may be referred to as a z-processing order. In embodiments, the processing order is based on, at least in part, the block size. A larger block size such as a 32×32 results in additional 4×4 pixel blocks, and a particular processing order according to the standard used.

As can be seen, for some 4×4 pixel blocks, the immediate predecessor block must be assigned a prediction mode (e.g., block 114, FIG. 1), transformed (e.g., block 118, FIG. 1), and quantized (e.g., block 120, FIG. 1) so that additional processing for use in intra-prediction can occur. Specifically, for use in intra-prediction the immediate processor block must be inverse quantized (e.g., block 124, FIG. 1), inverse transformed (e.g., block 126, FIG. 1), and summed with the current predicted block at reference number 128. This reconstruction or reconstruction loop includes blocks 114, 116, 118, 120, 124, 126, and 128 of FIG. 1 and enables an immediate predecessor block to be used for intra-prediction of a current block. As used herein, processing an immediate predecessor block refers to the block being completely processed via the reconstruction loop created from blocks 114, 116, 118, 120, 124, 126, and 128 of FIG. 1. An immediate predecessor block is a block that is processed immediately prior to the current block. In the example of FIG. 2, the blocks 0-15 are processed though this loop in the order indicated by the arrows from block 0 to block 15.

The processing order combined with particular prediction angles can cause an increase in latency, as the prediction angle can create a dependency on a block that is not available yet according to the processing order. For example, to encode block 4, processed data from block 1 is needed according to some prediction angles. Likewise, to process block 8, encoded data from block 2 is needed according to some prediction angles. This data dependency causes a hardware pipeline slowdown and can significantly impact pipeline throughput, especially for video with high texture content, in which a high number of 4×4 pixel blocks are encoded.

Figure 3:
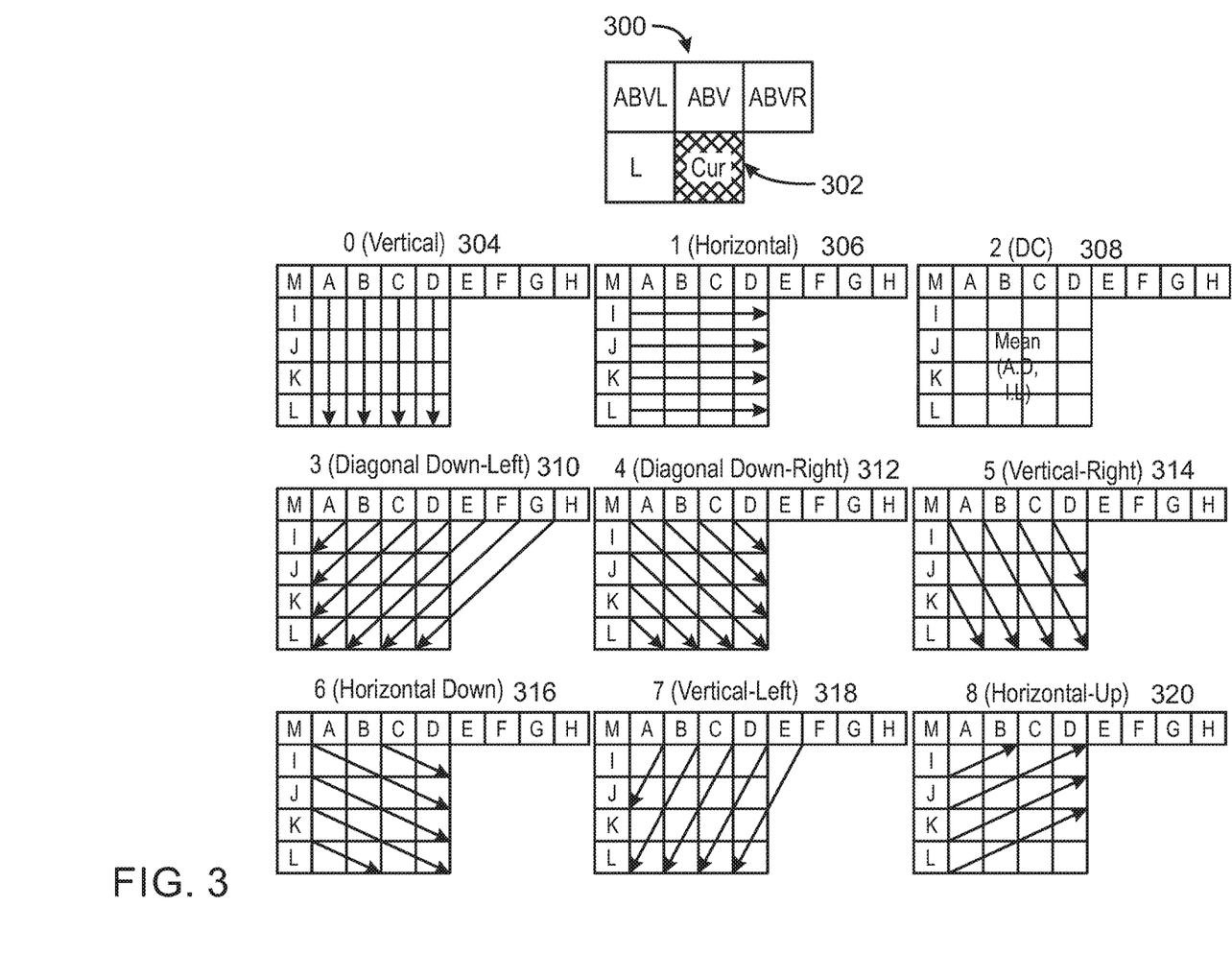
FIG. 3 is a block diagram of intra-prediction modes.

FIG. 3 is a block diagram of prediction angles. These prediction angles may be searched and selected during intra-prediction (e.g., block 110, FIG. 1). In most modern video coding standards released after H.264, intra-prediction is a coding tool that takes advantage of the redundant information between the current encoded pixel block and its neighboring pixel blocks. Typically, in a video encoder a searching stage explores the spatial correlation between the current pixel block and its neighboring blocks that have been encoded following the encoder processing order and selects a best prediction angle (direction) that indicates which previous encoded blocks can produce a better predicted pixel block for the current block. This prediction angle or direction is also referred to as an intra-prediction mode in some video coding standards. Depending on the size of the coded block, there will be different number of allowed intra-prediction angles (modes). For example, in the H.264/AVC standard, for 4×4 coded pixel blocks, nine possible prediction angles are allowed as shown in FIG. 3.

At reference number 300, five neighboring pixel blocks are illustrated. The 4×4 pixel blocks may be noted as the left (L) block, above (ABV) block, above right (ABVR) block, above left (ABVL) block, and a current block 302. Each 4×4 pixel block at reference number 300 may be, for example, a 4×4 pixel block of a 16×16 macroblock, such as the macroblock 200 of FIG. 2. In the present embodiment, the left 4×4 pixel block L, above 4×4 pixel block ABV, above right 4×4 pixel block ABVR, above left 4×4 pixel block ABVL, and current pixel block 302 are subject to a particular processing order according to a video coding standard. This processing order may be the z-processing order as illustrated in FIG. 2.

FIG. 3 also illustrates nine prediction angles 304, 306, 308, 310, 312, 314, 316, 318, and 320. Each of the prediction angles are used to predict a best pixel value for each pixel of the current block. As illustrated, for each of the prediction angle directions, several pixels A-L are illustrated. Specifically, pixels A, B, C, and D are pixels of the above (ABV) 4×4 pixel block at reference number 300. Pixels I, J, K, and L are pixels of the left (L) 4×4 pixel block at reference number 300. Pixel M is a pixel of the above left (ABVL) 4×4 pixel block at reference number 300. Finally, pixels E, F, G, and H are pixels of above right (ABVR) 4×4 pixel block at reference number 300.

In the illustrated prediction angles, the arrows are drawn atop of the current block to indicate the pixels used to predict the current block. For the vertical prediction angle 304, pixels A-D of the above (ABV) block are used to predict the current block as indicated by the arrows across the current block. For the horizontal prediction angle 306, pixels I-L of the left (L) block are used to predict the current block as indicated by the arrows across the current block. For the DC prediction angle 308, a mean of pixels A, B, C, D of the above (ABV) block and I, J, K, L of the left (L), are used to predict the current block. In particular, for the DC prediction 308 a mean may be derived using pixels A, B, C, D, I, J, K, and L. For the diagonal down left prediction angle 310, pixels A-H from the above (ABV) and the above right (ABVR) blocks, respectively, are used to encode the current block as indicated by the arrows across the current block. For the diagonal down right prediction angle 312, pixels A-D, M, and I-L of the above (ABV) block, above left (ABVL) block, and left (L) block, respectively, are used to predict the current block as indicated by the arrows across the current block. Similarly, for the vertical right prediction angle 314, pixels A-D, M, and I-L of the above (ABV) block, above left (ABVL) block, and left (L) block, respectively, are used to predict the current block as indicated by the arrows across the current block. For the horizontal down prediction angle 316, pixels A-D, M, and I-L of the above (ABV) block, above left (ABVL) block, and left (L) block, respectively, are used to predict the current block as indicated by the arrows across the current block. The vertical left prediction angle 318 uses pixels A-F of the above (ABV) block and above right (ABVR) block, respectively, to predict the current block as indicated by the arrows across the current block. Finally, the horizontal up prediction angle 320, pixels I-L of the left (L) block are used to predict the current block as indicated by the arrows across the current block.

The prediction angles may be searched to determine a best intra-prediction mode. The best intra-prediction mode may be determined by a number of factors, including the number of errors generated by the prediction angle and the number of bits used to predict the current block according to the prediction angle. During traditional intra-prediction, each of the prediction angles 304, 306, 308, 310, 312, 314, 316, 318, and 320 may be searched to determine a best prediction angle. Searching may include various calculations, such as calculating a sum of absolute errors (SAE) to determine the prediction angle with the lowest SAE. Consider mode 3 (diagonal down-left) at reference number 310. Processed and reconstructed pixels from the above block (ABV) and the above right block (ABVR) are used to derive predicted pixels for encoding the current block according to the diagonal down-left prediction angle at reference number 310. In particular, pixels A, B, C, and D (from pixel block ABV) and E, F, G, and H (from pixel block ABVR) are used to predict values for all pixels of the current block 302 according to the diagonal down-left prediction angle at reference number 310.

In a hardware implementation, supporting intra-prediction for small pixel blocks, such as 4×4 pixel blocks, may impose some challenges. Due to the nature of the intra-prediction and the processing order, a data dependency exists between different pixel blocks, such that in order to process a current block, reconstruction (as described by blocks 114, 116, 118, 120, 124, 126, and 128 of FIG. 1) of some of the neighboring blocks must be done. Table 1 below illustrates the dependent neighboring blocks for the intra-prediction modes described in FIG. 3.

TABLE 1

Dependent Neighboring Blocks for Intra-Prediction Modes

| Mode (Prediction angle) | Dependent on Pixel Block Neighbors |
| --- | --- |
| 0 (vertical) | ABV |
| 1 (horizontal) | L |
| 2 (DC) | L, ABV |
| 3 (diagonal down-left) | ABV, ABVR |
| 4 (diagonal down-right) | L, ABV, ABVL |
| 5 (vertical-right) | L, ABV, ABVL |
| 6 (horizontal-down) | L, ABV, ABVL |
| 7 (vertical-left) | ABV, ABVR |
| 8 (horizontal-up) | L |

Thus, for a particular prediction angle, a current block is dependent on neighboring blocks positioned in the Dependent of Pixel Block Neighbors of Table 1. To reduce latency associated with searching all available intra-prediction modes, the present techniques disable prediction angles for a particular block based on the block's location and the availability of immediate predecessor blocks based on the encoding processing order. For every 4×4 pixel block, depending on its location and processing order applied to the macroblock, certain prediction angles are disabled during the searching stage. This results in a reduction of the number of prediction angles to be searched. As used herein, disabling a prediction angle refers to preventing the encoder from searching and selecting a prediction angle. In embodiments, the present techniques are applied to an encoder architecture that uses two stages in the encoding pipeline. The first stage determines the prediction mode for the pixel block, while the second stage executes the final reconstruction and entropy encoding.

Table 2 outlines the specific prediction angles that are disabled for particular 4×4 pixel blocks with a location and processing order as described in FIGS. 2 and 3.

TABLE 2

Disabled intra-prediction modes and removed dependency

| Block | Disabled Prediction Angle | Remove Dependency on Pixel Block | Remove Dependency on Immediate Predecessor Block |
| --- | --- | --- | --- |
| 0 | None | | |
| 1 | 1, 2, 4, 5, 6, 8 | Left (L) | 0 |
| 2 | 3, 7 | Above Right (ABVR) | 1 |
| 3 | 1, 2, 4, 5, 6, 8 | Left (L) | 2 |
| 4 | None | None | None |
| 5 | 1, 2, 4, 5, 6, 8 | Left (L) | 4 |
| 6 | 3, 7 | Above Right (ABVR) | 5 |
| 7 | 1, 2, 4, 5, 6, 8 | Left (L) | 6 |
| 8 | None | None | None |
| 9 | 1, 2, 4, 5, 6, 8 | Left (L) | 8 |
| 10 | 3, 7 | Above Right (ABVR) | 9 |
| 11 | 1, 2, 4, 5, 6, 8 | Left (L) | 10 |
| 12 | None | None | None |
| 13 | 1, 2, 4, 5, 6, 8 | Left (L) | 12 |
| 14 | 3, 7 | Above Right (ABVR) | 13 |
| 15 | 1, 2, 4, 5, 6, 8 | Left (L) | 14 |

As is illustrated by Table 2, prediction angles are disabled in order to remove any dependency on the immediate predecessor block during prediction. For each of blocks 0, 4, 8, and 12, none of the nine prediction angles causes a dependency on its immediate predecessor block during intra-prediction. Put another way, none of the nine prediction angles uses pixels from the bottom left block for prediction. As a result, all possible intra-prediction modes are allowed for blocks 0, 4, 8, and 12. As an example, consider block 1 of FIG. 2. Block 1 has a dependency on block 0 according to the processing order described in FIG. 2. As illustrated in FIG. 3, block 0 is considered the left (L) 4×4 pixel block when block 1 is the current block. To eliminate any latency associated with searching prediction angles when encoding block 1, any prediction angle that uses the left (L) 4×4 pixel block to predict the current block (block 1) is disabled. A review of the nine prediction angles 304, 306, 308, 310, 312, 314, 316, 318, and 320 reveals that prediction angles horizontal 306, DC 308, diagonal-down right 312, vertical-right 314, horizontal down 316, and horizontal up 320 each use pixels from the left (L) 4×4 pixel block (block 0) to predict the pixels of block 1. Thus, in the encoding of block 1, the prediction angles horizontal 306, DC 308, diagonal-down right 312, vertical-right 314, horizontal down 316, and horizontal up 320 are eliminated from consideration during searching, as their use will cause an increase in latency associated with intra-prediction searches when encoding block 1.

For block 2, block 1 is an immediate predecessor block according to the processing order illustrated in FIG. 2. Block 1 is positioned to be the above right block (ABVR) when block 2 is the current block. To eliminate any latency associated with searching prediction angles when encoding block 2, any prediction angle that uses the above right (ABVR) block (block 1) to predict the current block (block 2) is disabled. A review of the nine prediction angles 304, 306, 308, 310, 312, 314, 316, 318, and 320 reveals that prediction angles horizontal diagonal down-left 310 and vertical left 318 each use pixels from block 1 to predict the pixels of block 2. Thus, in the encoding of block 2, the prediction angles horizontal diagonal down-left 310 and vertical left 318 are eliminated from consideration as their use will cause an increase in latency associated with intra-prediction searches.

Block 3 has a dependency on block 2 according to the processing order described in FIG. 2. As illustrated in FIG. 3, block 2 is considered the left (L) 4×4 pixel block when block 3 is the current block. To eliminate any latency associated with searching prediction angles when encoding block 3, any intra-prediction mode that uses the left (L) block (block 2) to predict the current block (block 3) is disabled. A review of the nine prediction angles 304, 306, 308, 310, 312, 314, 316, 318, and 320 reveals that prediction angles horizontal 306, DC 308, diagonal-down right 312, vertical-right 314, horizontal down 316, and horizontal up 320 each use pixels from block 2 to predict the pixels of block 3. Thus, in the encoding of block 3, the prediction angles horizontal 306, DC 308, diagonal-down right 312, vertical-right 314, horizontal down 316, and horizontal up 320 are eliminated from consideration as their use will cause an increase in latency associated with intra-prediction searches.

Table 2 details the dependency between immediate predecessor blocks, current blocks, and prediction angle directions. As detailed in Table 2, blocks 5, 9, and 13 are treated similar to block 1 in that dependency on the left block is eliminated. Blocks 6, 10, and 14 are treated similar to block 2 in that dependency on the above right block is eliminated. Finally, blocks 7, 11, and 15 are treated similar to block 3 in that dependency on the left block is eliminated. Thus, a prediction angle is disabled when the immediate predecessor block is used to predict the current block according to the prediction angle. The immediate predecessor block is defined by the processing order. In examples, the immediate predecessor block is the block that is previously processed, without any other intervening processing of another block, according to the processing order. By eliminating prediction angle directions that rely on an immediate predecessor block of a current block, the blocks can be encoded in parallel according to the dependency and timing diagram as illustrated in FIG. 4.

Figure 4:
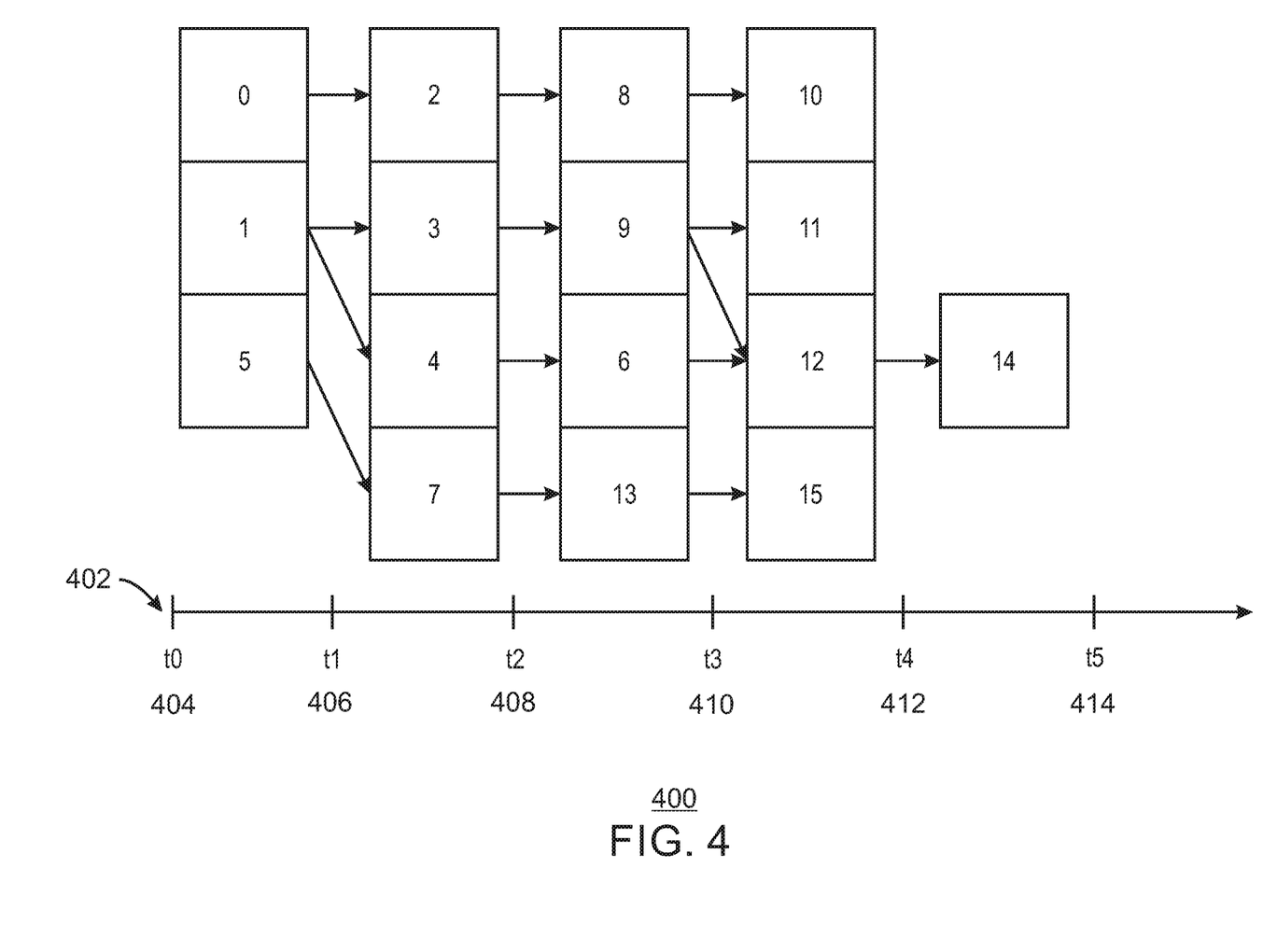
FIG. 4 is a block diagram of dependency and timing during intra-prediction.

FIG. 4 is a graph of dependency and timing during intra-prediction. In the example of FIG. 4, the parallel processing order is derived from the original processing order combined with the disabled prediction angles for each block. In FIG. 4, an arrow indicates the dependency after the reordering the processing flow according to the present techniques. For example, processing block 6 between time period t2 408 and time period t3 410, now depend on block 4 now, and processing block 12 would depend on block 6 and 9. Here, the blocks can be processed in parallel assuming each block takes the same amount of time to process.

The macroblock processing in FIG. 4 is modeled as a directed graph. The particular parallel processing scheme can be derived by first eliminating any dependencies on an immediate predecessor block as described above. Then, each block can be treated as a node of the graph. Each dependency can be modeled as an edge of the graph. A parallel processing intra-prediction scheme, such as the scheme illustrated by the graph 400, can be derived by modeling intra-prediction with the disabled prediction angles as a directed graph.

In FIG. 4, the parallel processing of pixel blocks when certain intra-prediction modes are disabled can be done in hardware, software, or any combination thereof. With this approach, pipeline throughput for 4×4 pixel block intra-prediction can be significantly improved. Encoding quality is also improved compared to a configuration that completely disables intra-prediction on 4×4 pixel blocks due to performance. The same approach can be applied to other encoders as well, such as HEVC and VP9, etc. With more aggressive approach, more intra-prediction modes can be disallowed to remove the dependency and speed up the pipeline performance even further.

Figure 5:
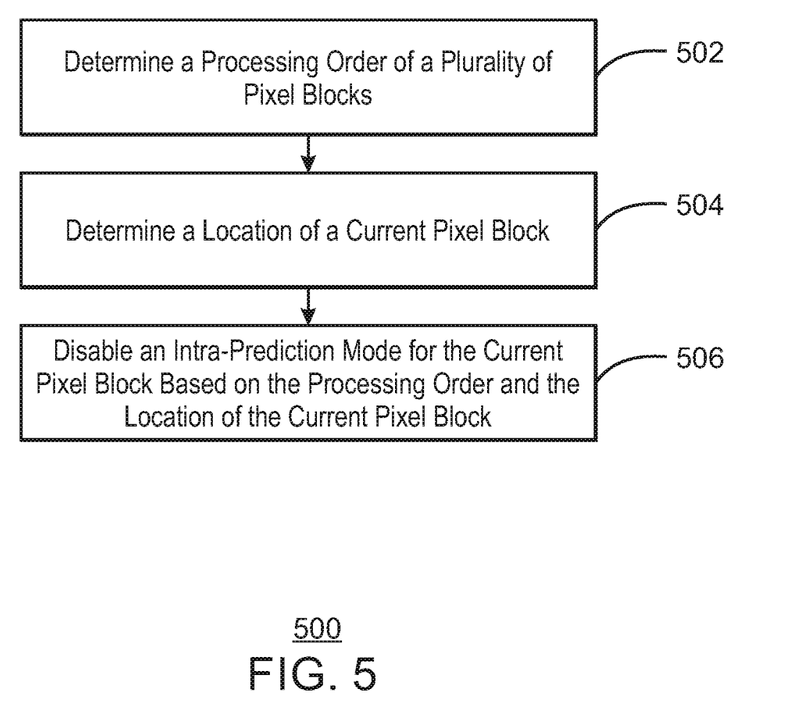
FIG. 5 is a process flow diagram of a method for hardware video coding.

FIG. 5 is a process flow diagram of a method 500 for small block hardware encoding. At block 502, a processing order of a plurality of blocks is determined. At block 504, an immediate predecessor block of a current block is determined. At block 506, a prediction angle for a current pixel block is disabled based on the immediate predecessor block.

Figure 6:
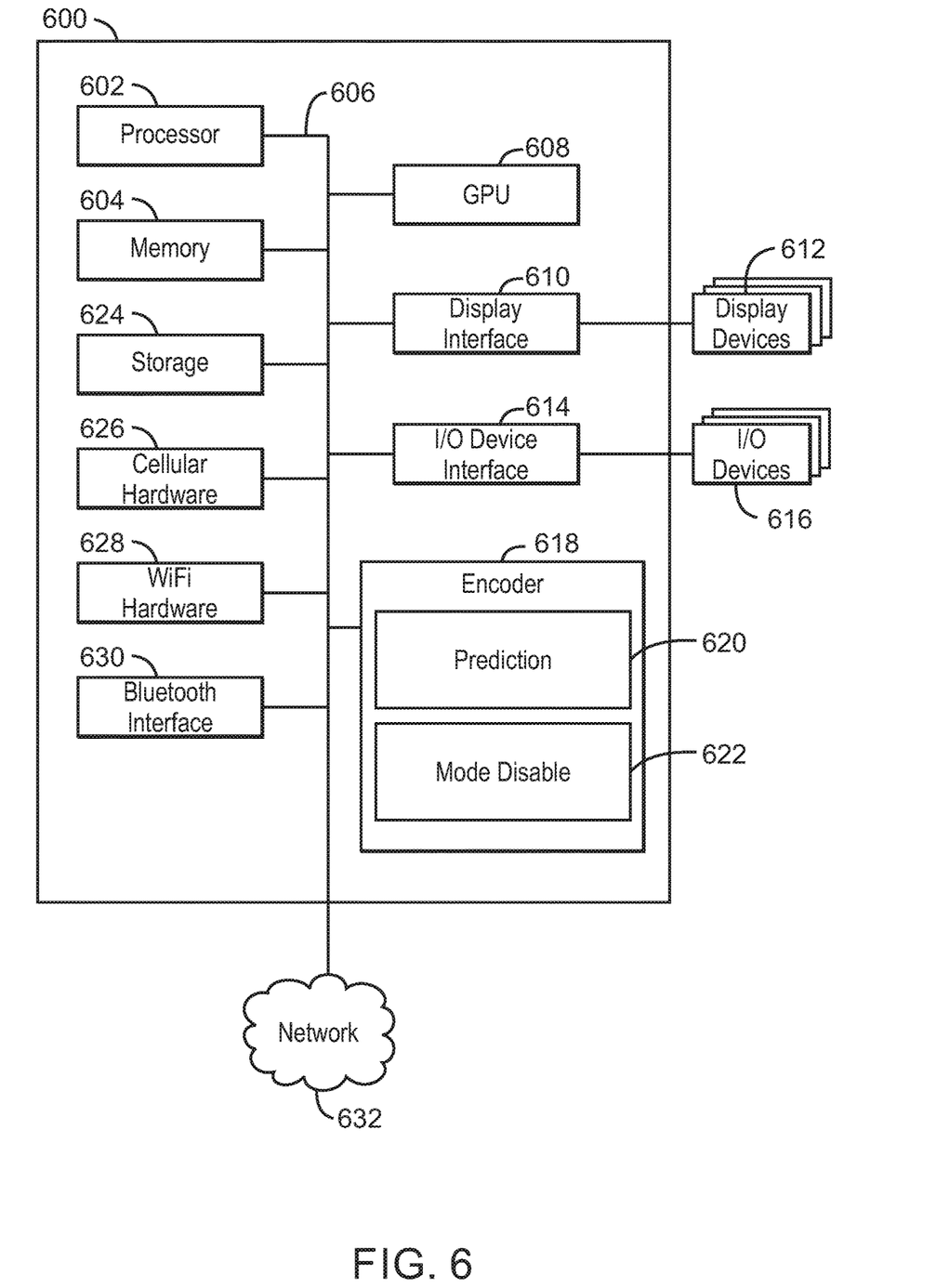
FIG. 6 is a block diagram of a computing device that may be used for small block hardware video coding.

FIG. 6 is a block diagram of an electronic device 600 that may be used for small block hardware video coding. The electronic device 600 may be, for example, a laptop computer, tablet computer, mobile phone, smart phone, or a wearable device, among others. The electronic device 600 may include a central processing unit (CPU) 602 that is configured to execute stored instructions, as well as a memory device 604 that stores instructions that are executable by the CPU 602. The CPU may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM). The memory device 604 may include device drivers that are configured to execute the instructions for device discovery speeding up intra-prediction via small block hardware coding as described above. The device drivers may be software, an application program, application code, or the like.

The electronic device 600 also includes a graphics processing unit (GPU) 608. As shown, the CPU 602 can be coupled through the bus 606 to the GPU 608. The GPU 608 can be configured to perform any number of graphics operations within the electronic device 600. For example, the GPU 608 can be configured to render or manipulate graphics images, graphics frames, videos, or the like, to be displayed to a user of the electronic device 600. In some embodiments, the GPU 608 includes a number of graphics engines, wherein each graphics engine is configured to perform specific graphics tasks, or to execute specific types of workloads. For example, the GPU 608 may include an engine that enables intra-prediction via small block hardware coding as described above.

The CPU 602 can be linked through the bus 606 to a display interface 610 configured to connect the electronic device 600 to a plurality of display devices 612. The display devices 612 can include a display screen that is a built-in component of the electronic device 600. The display devices 612 can also include a computer monitor, television, or projector, among others, that is externally connected to the electronic device 600.

The CPU 602 can also be connected through the bus 606 to an input/output (I/O) device interface 614 configured to connect the electronic device 600 to one or more I/O devices 616. The I/O devices 616 can include, for example, a keyboard and a pointing device, wherein the pointing device can include a touchpad or a touchscreen, among others. The I/O devices 616 can be built-in components of the electronic device 600, or can be devices that are externally connected to the electronic device 600. In some examples, the memory 604 may be communicatively coupled to I/O devices 614 through direct memory access (DMA).

The computing device 600 may include an encoder 618. The encoder 618 may be a hardware encoder without programmable engines executing within the main loop of an encoder algorithm. In embodiments, this may be referred to as fixed function encoding. A prediction module 620 may be configured to determine a number of available prediction modes based on the processing order of the present frame. A mode disable module 622 may disable prediction angles based on an immediate predecessor block. The immediate predecessor block may be defined by the processing order.

The electronic device may also include a storage device 624. The storage device 624 is a physical memory such as a hard drive, an optical drive, a flash drive, an array of drives, or any combinations thereof. The storage device 624 can store user data, such as audio files, video files, audio/video files, and picture files, among others. The storage device 624 can also store programming code such as device drivers, software applications, operating systems, and the like. The programming code stored to the storage device 624 may be executed by the CPU 602, GPU 608, or any other processors that may be included in the electronic device 600.

The CPU 602 may be linked through the bus 606 to cellular hardware 626. The cellular hardware 626 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 600 may access any network 632 without being tethered or paired to another device, where the network 632 is a cellular network.

The CPU 602 may also be linked through the bus 606 to WiFi hardware 628. The WiFi hardware is hardware according to WiFi standards (standards promulgated as Institute of Electrical and Electronics Engineers' (IEEE) 802.11 standards). The WiFi hardware 628 enables the electronic device 600 to connect to the Internet using the Transmission Control Protocol and the Internet Protocol (TCP/IP), where the network 632 is the Internet. Accordingly, the electronic device 600 can enable end-to-end connectivity with the Internet by addressing, routing, transmitting, and receiving data according to the TCP/IP protocol without the use of another device. Additionally, a Bluetooth Interface 630 may be coupled to the CPU 602 through the bus 606. The Bluetooth Interface 630 is an interface according to Bluetooth networks (based on the Bluetooth standard promulgated by the Bluetooth Special Interest Group). The Bluetooth Interface 630 enables the electronic device 600 to be paired with other Bluetooth enabled devices through a personal area network (PAN). Accordingly, the network 632 may be a PAN. Examples of Bluetooth enabled devices include a laptop computer, desktop computer, ultrabook, tablet computer, mobile device, or server, among others.

The block diagram of FIG. 6 is not intended to indicate that the electronic device 600 is to include all of the components shown in FIG. 6. Rather, the computing system 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the prediction module 620 or the mode disable module 622 may be partially, or entirely, implemented in hardware and/or in the processor 602 or the GPU 608. For example, the functionality may be implemented with an application specific integrated circuit, in logic implemented in the processor 602, the GPU 608, or in any other device. For example, the functionality of the mode disable module 622 may be implemented with an application specific integrated circuit, in logic implemented in a processor, in logic implemented in a specialized graphics processing unit such as the GPU 608, or in any other device.

Figure 7:
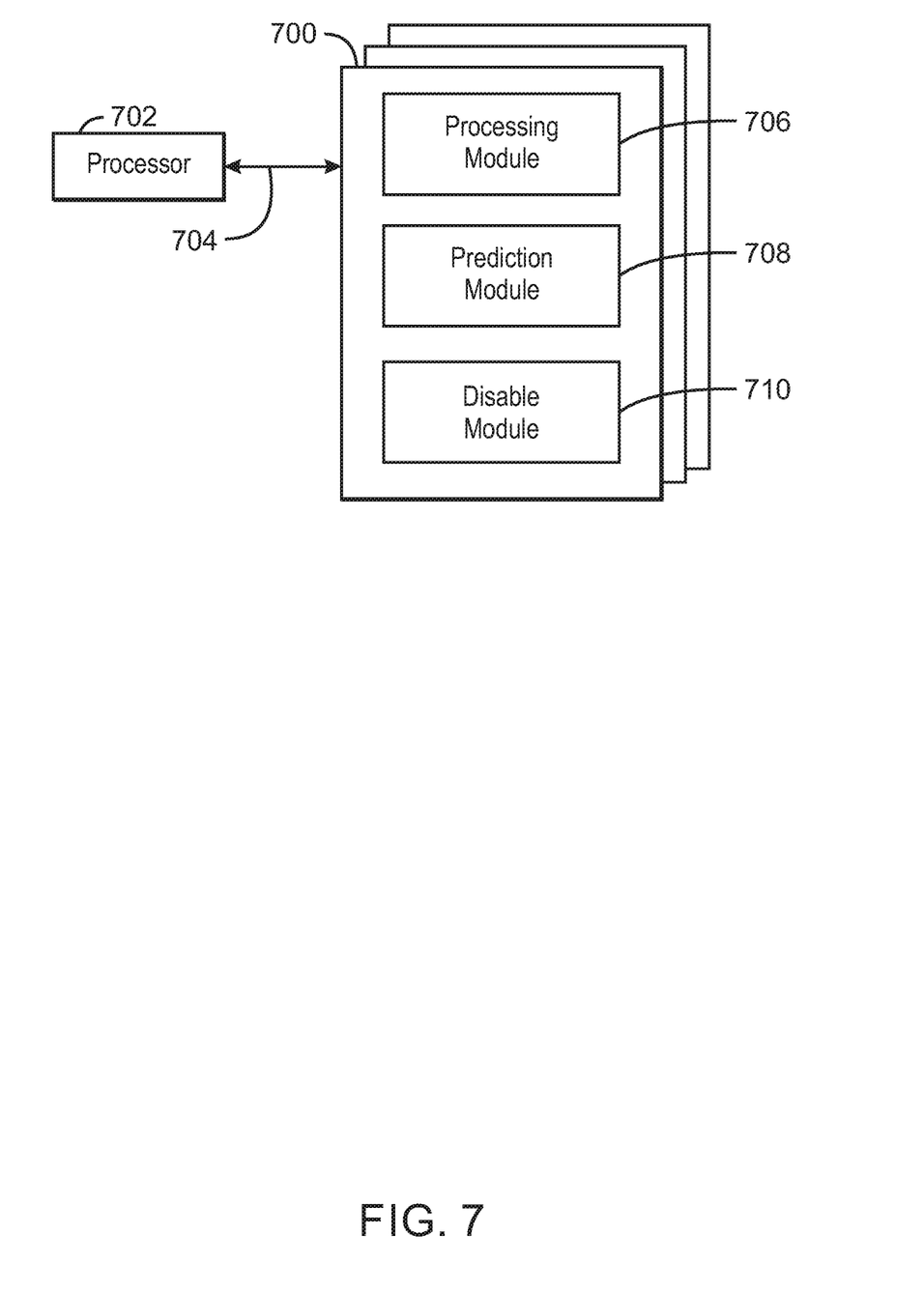
FIG. 7 is a block diagram showing a medium that contains logic for small block hardware video encoding.

FIG. 7 is a block diagram showing a medium 700 that contains logic for hardware video encoding. The medium 700 may be a computer-readable medium, including a non-transitory medium that stores code that can be accessed by a processor 702 over a computer bus 704. For example, the computer-readable medium 700 can be volatile or non-volatile data storage device. The medium 700 can also be a logic unit, such as an Application Specific Integrated Circuit (ASIC), a Field Programmable Gate Array (FPGA), or an arrangement of logic gates implemented in one or more integrated circuits, for example.

The medium 700 may include modules 706-710 configured to perform the techniques described herein. For example, a processing module 706 may be configured to determine a processing order of a plurality of pixel blocks. A prediction module 708 may be configured to determine a plurality of available prediction angles. A disable module 710 may be configured to disable a prediction angle for a current pixel block based on the processing order and the location of the current pixel block.

The block diagram of FIG. 7 is not intended to indicate that the medium 700 is to include all of the components shown in FIG. 7. Further, the medium 700 may include any number of additional components not shown in FIG. 7, depending on the details of the specific implementation.

Example 1 is a system for speeding up small block intra-prediction in video coding. The system includes an encoder, wherein when the encoder is to execute intra-prediction, the encoder is operable to: derive a plurality of prediction angles, wherein the prediction angles are based on a video coding standard; disable a prediction angle for a current block to eliminate a dependency on an immediate predecessor block.

Example 2 includes the system of example 1, including or excluding optional features. In this example, disabling the prediction angle comprises modifying an intra-prediction searching stage of encoder processing.

Example 3 includes the system of any one of examples 1 to 2, including or excluding optional features. In this example, the dependency is data from the immediate predecessor block is processed to predict the current block.

Example 4 includes the system of any one of examples 1 to 3, including or excluding optional features. In this example, a processing order of a macroblock during encoding is to determine the immediate predecessor block of the current predecessor block.

Example 5 includes the system of any one of examples 1 to 4, including or excluding optional features. In this example, the number of prediction angles is based on a size of a macroblock.

Example 6 includes the system of any one of examples 1 to 5, including or excluding optional features. In this example, the immediate predecessor block is a block that is to be processed immediately prior to the current block.

Example 7 includes the system of any one of examples 1 to 6, including or excluding optional features. In this example, the current block and the immediate predecessor block are processed in parallel.

Example 8 includes the system of any one of examples 1 to 7, including or excluding optional features. In this example, the current block and the predecessor block are 4×4 pixel blocks.

Example 9 includes the system of any one of examples 1 to 8, including or excluding optional features. In this example, the current block and the predecessor block are 16×16 pixel blocks.

Example 10 includes the system of any one of examples 1 to 9, including or excluding optional features. In this example, the video coding standard is H.264/AVC.

Example 11 is a method for speeding up small block intra-prediction in video coding. The method includes determining a processing order of a plurality of 4×4 pixel blocks of a macroblock; determining an immediate predecessor block for the current 4×4 pixel block based on the processing order; and disabling a prediction angle for the current 4×4 pixel block to eliminate a processing dependency on the immediate predecessor block.

Example 12 includes the method of example 11, including or excluding optional features. In this example, the method includes selecting a best prediction angle, wherein the best prediction angle predicts the current 4×4 pixel block without input from the immediate predecessor block.

Example 13 includes the method of any one of examples 11 to 12, including or excluding optional features. In this example, the processing order is a z-processing order.

Example 14 includes the method of any one of examples 11 to 13, including or excluding optional features. In this example, the method includes deriving a parallel processing intra-prediction scheme by modeling intra-prediction with the disabled prediction angle as a directed graph.

Example 15 includes the method of any one of examples 11 to 14, including or excluding optional features. In this example, the prediction angle is one of a vertical prediction angle, horizontal prediction angle, DC prediction angle, diagonal down left prediction angle, diagonal down right prediction angle, vertical right prediction angle, horizontal down prediction angle, vertical left prediction angle, or horizontal up prediction angle.

Example 16 includes the method of any one of examples 11 to 15, including or excluding optional features. In this example, the immediate predecessor block is a block that is used to predict the current 4×4 pixel block according to the processing order.

Example 17 includes the method of any one of examples 11 to 16, including or excluding optional features. In this example, disabling the prediction angle for the current 4×4 pixel block enables the plurality of 4×4 pixel blocks to be encoded in parallel.

Example 18 includes the method of any one of examples 11 to 17, including or excluding optional features. In this example, the processing dependency is that the immediate predecessor block must be predicted prior to predicting the current 4×4 pixel block.

Example 19 includes the method of any one of examples 11 to 18, including or excluding optional features. In this example, the macroblock is a 16×16 macroblock.

Example 20 includes the method of any one of examples 11 to 19, including or excluding optional features. In this example, the macroblock is a 32×32 macroblock.

Example 21 is at least one non-transitory machine readable medium having instructions stored therein that. The computer-readable medium includes instructions that direct the processor to determine a processing order of a plurality of 4×4 pixel blocks of a macroblock; determine an immediate predecessor block for the current 4×4 pixel block based on the processing order; and disable a prediction angle for the current 4×4 pixel block to eliminate a processing dependency on the immediate predecessor block.

Example 22 includes the computer-readable medium of example 21, including or excluding optional features. In this example, the computer-readable medium includes selecting a best prediction angle, wherein the best prediction angle predicts the current 4×4 pixel block without input from the immediate predecessor block.

Example 23 includes the computer-readable medium of any one of examples 21 to 22, including or excluding optional features. In this example, the processing order is a z-processing order.

Example 24 includes the computer-readable medium of any one of examples 21 to 23, including or excluding optional features. In this example, the computer-readable medium includes deriving a parallel processing intra-prediction scheme by modeling intra-prediction with the disabled prediction angle as a directed graph.

Example 25 includes the computer-readable medium of any one of examples 21 to 24, including or excluding optional features. In this example, the prediction angle is one of a vertical prediction angle, horizontal prediction angle, DC prediction angle, diagonal down left prediction angle, diagonal down right prediction angle, vertical right prediction angle, horizontal down prediction angle, vertical left prediction angle, or horizontal up prediction angle.

Example 26 includes the computer-readable medium of any one of examples 21 to 25, including or excluding optional features. In this example, the immediate predecessor block is a block that is used to predict the current 4×4 pixel block according to the processing order.

Example 27 includes the computer-readable medium of any one of examples 21 to 26, including or excluding optional features. In this example, disabling the prediction angle for the current 4×4 pixel block enables the plurality of 4×4 pixel blocks to be encoded in parallel.

Example 28 includes the computer-readable medium of any one of examples 21 to 27, including or excluding optional features. In this example, the processing dependency is that the immediate predecessor block must be predicted prior to predicting the current 4×4 pixel block.

Example 29 includes the computer-readable medium of any one of examples 21 to 28, including or excluding optional features. In this example, the macroblock is a 16×16 macroblock.

Example 30 includes the computer-readable medium of any one of examples 21 to 29, including or excluding optional features. In this example, the macroblock is a 32×32 macroblock.

Example 31 is an encoder. The encoder includes instructions that direct the processor to a prediction module to derive a best prediction angle from a plurality of prediction angles and disable a prediction angle for a current block to eliminate a dependency on an immediate predecessor block; a transformer to transform residuals generated from a macroblock predicted based on the best prediction angle; a quantizer to quantize the transformed residuals; and an encoder to encode the quantized, transformed residuals.

Example 32 includes the encoder of example 31, including or excluding optional features. In this example, disabling the prediction angle comprises modifying an intra-prediction searching stage of encoder processing.

Example 33 includes the encoder of any one of examples 31 to 32, including or excluding optional features. In this example, the dependency is data from the immediate predecessor block is processed to predict the current block.

Example 34 includes the encoder of any one of examples 31 to 33, including or excluding optional features. In this example, a processing order of the macroblock during encoding is to determine the immediate predecessor block of the current predecessor block.

Example 35 includes the encoder of any one of examples 31 to 34, including or excluding optional features. In this example, the plurality of prediction angles is based on a size of the macroblock.

Example 36 includes the encoder of any one of examples 31 to 35, including or excluding optional features. In this example, the immediate predecessor block is a block that is to be processed immediately prior to the current block.

Example 37 includes the encoder of any one of examples 31 to 36, including or excluding optional features. In this example, the current block and the immediate predecessor block are predicted simultaneously.

Example 38 includes the encoder of any one of examples 31 to 37, including or excluding optional features. In this example, the current block and the predecessor block are 4×4 pixel blocks.

Example 39 includes the encoder of any one of examples 31 to 38, including or excluding optional features. In this example, the current block and the predecessor block are 16×16 pixel blocks.

Example 40 includes the encoder of any one of examples 31 to 39, including or excluding optional features. In this example, the plurality of prediction angles is based on a video coding standard.

Example 41 is an apparatus. The apparatus includes instructions that direct the processor to a prediction module to derive a best prediction angle from a plurality of prediction angles; a means to disable a prediction angle for a current block to eliminate a dependency on an immediate predecessor block; a transformer to transform residuals generated from a macroblock predicted based on the best prediction angle; a quantizer to quantize the transformed residuals; and an encoder to encode the quantized, transformed residuals.

Example 42 includes the apparatus of example 41, including or excluding optional features. In this example, disabling the prediction angle comprises modifying an intra-prediction searching stage of encoder processing.

Example 43 includes the apparatus of any one of examples 41 to 42, including or excluding optional features. In this example, the dependency is data from the immediate predecessor block is processed to predict the current block.

Example 44 includes the apparatus of any one of examples 41 to 43, including or excluding optional features. In this example, a processing order of the macroblock during encoding is to determine the immediate predecessor block of the current predecessor block.

Example 45 includes the apparatus of any one of examples 41 to 44, including or excluding optional features. In this example, the plurality of prediction angles is based on a size of the macroblock.

Example 46 includes the apparatus of any one of examples 41 to 45, including or excluding optional features. In this example, the immediate predecessor block is a block that is to be processed immediately prior to the current block.

Example 47 includes the apparatus of any one of examples 41 to 46, including or excluding optional features. In this example, the current block and the immediate predecessor block are predicted simultaneously.

Example 48 includes the apparatus of any one of examples 41 to 47, including or excluding optional features. In this example, the current block and the predecessor block are 4×4 pixel blocks.

Example 49 includes the apparatus of any one of examples 41 to 48, including or excluding optional features. In this example, the current block and the predecessor block are 16×16 pixel blocks.

Example 50 includes the apparatus of any one of examples 41 to 49, including or excluding optional features. In this example, the plurality of prediction angles is based on a video coding standard.

It is to be understood that specifics in the aforementioned examples may be used anywhere in one or more embodiments. For instance, all optional features of the electronic device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for speeding up small block intra-prediction in video coding, comprising:
    an encoder, wherein when the encoder is to execute intra-prediction, the encoder is operable to:
        derive a plurality of prediction angles, wherein the prediction angles are based on a video coding standard; and
        disable a prediction angle for a current block based on a processing order of the current block to eliminate a dependency on an immediate predecessor block, wherein the immediate predecessor block is a block that is to be processed immediately prior to the current block.

2. The system of claim 1, wherein disabling the prediction angle comprises modifying an intra-prediction searching stage of encoder processing.

3. The system of claim 1, wherein the dependency on the immediate predecessor block is data from the immediate predecessor block that is processed to predict the current block for a particular prediction angle.

4. The system of claim 1, wherein the processing order of a macroblock comprising the current block during encoding is to determine the immediate predecessor block of the current predecessor block.

5. The system of claim 1, wherein the plurality of prediction angles is based on a size of a macroblock comprising the current block.

6. The system of claim 1, wherein the current block and the immediate predecessor block are processed in parallel.

7. The system of claim 1, wherein the current block and the immediate predecessor block are 4×4 pixel blocks.

8. The system of claim 1, wherein the current block and the immediate predecessor block are 16×16 pixel blocks.

9. The system of claim 1, wherein the video coding standard is H.264/AVC.

10. A method for speeding up small block intra-prediction in video coding, comprising:
    determining a processing order of a plurality of 4×4 pixel blocks of a macroblock;
    determining an immediate predecessor block for a current 4×4 pixel block based on the processing order, wherein the immediate predecessor block is a block that is to be processed immediately prior to the current 4×4 pixel block; and
    disabling a prediction angle for the current 4×4 pixel block based on the processing order to eliminate a processing dependency on the immediate predecessor block.

11. The method of claim 10, comprising selecting a best prediction angle, wherein the best prediction angle predicts the current 4×4 pixel block without input from the immediate predecessor block.

12. The method of claim 10, wherein the processing order is a z-processing order.

13. The method of claim 10, comprising deriving a parallel processing intra-prediction scheme by modeling intra-prediction with the disabled prediction angle as a directed graph.

14. The method of claim 10, wherein the prediction angle is one of a vertical prediction angle, horizontal prediction angle, DC prediction angle, diagonal down left prediction angle, diagonal down right prediction angle, vertical right prediction angle, horizontal down prediction angle, vertical left prediction angle, or horizontal up prediction angle.

15. The method of claim 10, wherein the immediate predecessor block is a block that is used to predict the current 4×4 pixel block according to the processing order.

16. The method of claim 10, wherein disabling the prediction angle for the current 4×4 pixel block enables the plurality of 4×4 pixel blocks to be encoded in parallel.

17. The method of claim 10, wherein the processing dependency on the immediate predecessor block is data from the immediate predecessor block that is processed to predict the current block for a particular prediction angle.

18. The method of claim 10, wherein the macroblock is a 16×16 macroblock.

19. The method of claim 10, wherein the macroblock is a 32×32 macroblock.

20. At least one non-transitory machine readable medium having instructions stored therein that, in response to being executed on a computing device, cause the computing device to:
    determine a processing order of a plurality of 4×4 pixel blocks of a macroblock;
    determine an immediate predecessor block for a current 4×4 pixel block based on the processing order, wherein the immediate predecessor block is a block that is to be processed immediately prior to the current 4×4 pixel block; and
    disable a prediction angle for the current 4×4 pixel block based on the processing order to eliminate a processing dependency on the immediate predecessor block.

21. The computer readable medium of claim 20, comprising selecting a best prediction angle, wherein the best prediction angle predicts the current 4×4 pixel block without input from the immediate predecessor block.

22. An encoder, comprising:
    a processor to derive a best prediction angle from a plurality of prediction angles and disable a prediction angle for a current block based on a processing order of the current block to eliminate a dependency on an immediate predecessor block, wherein the immediate predecessor block is a block that is to be processed immediately prior to the current block;
    a transformer to transform residuals generated from a macroblock predicted based on the best prediction angle;
    a quantizer to quantize the transformed residuals; and
    an encoder to encode the quantized, transformed residuals.

23. The encoder of claim 22, wherein disabling the prediction angle comprises modifying an intra-prediction searching stage of encoder processing.

24. The encoder of claim 22, wherein the dependency on the immediate predecessor block is data from the immediate predecessor block that is processed to predict the current block for a particular prediction angle.

* * * * *